US008102566B2

(12) United States Patent
Hatori (10) Patent No.: US 8,102,566 B2
(45) Date of Patent: Jan. 24, 2012

(54) IMAGE PROCESSING APPARATUS, METHOD, PRODUCT FOR ADJUSTING OUTPUT PROFILE USED FOR COLOR MATCHING IN OUTPUT DEVICES

(75) Inventor: Kazushige Hatori, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 510 days.

(21) Appl. No.: 12/395,082

(22) Filed: Feb. 27, 2009

(65) Prior Publication Data
US 2009/0225340 A1    Sep. 10, 2009

(30) Foreign Application Priority Data

Mar. 4, 2008    (JP) .................................. 2008-053907

(51) Int. Cl.
*H04N 1/60*    (2006.01)

(52) U.S. Cl. ........................ 358/1.9; 358/504; 358/518

(58) Field of Classification Search .................. 358/1.9, 358/504, 518, 519, 520; 382/162, 167; 347/19
See application file for complete search history.

(56) References Cited

U.S. PATENT DOCUMENTS

| 7,328,958 | B2 * | 2/2008 | Tanaka | 347/19 |
| 7,513,952 | B2 * | 4/2009 | Mestha et al. | 358/520 |
| 7,646,507 | B2 * | 1/2010 | Ono | 358/1.9 |
| 7,782,482 | B2 * | 8/2010 | Tanaka | 358/518 |
| 7,933,053 | B2 * | 4/2011 | Dalal et al. | 358/518 |
| 2007/0058181 | A1 | 3/2007 | Hatori | |

FOREIGN PATENT DOCUMENTS

JP    2005-167630    6/2005

* cited by examiner

*Primary Examiner* — Scott A Rogers
(74) *Attorney, Agent, or Firm* — Fitzpatrick, Cella, Harper & Scinto (57) ABSTRACT

An image processing apparatus is provided that can adjust an output profile used for color matching in output devices. The image processing apparatus comprises: a unit to convert a target value of a device-independent color space into a value of a device-dependent color space; a unit to create a color chart to adjust the converted value of the device-dependent color space; a unit to select in the device-independent color space measured values measured from the color chart; a unit to convert the selected measured values into values of device-dependent color space, and calculate a target value of the device-dependent color space corresponding to the target value of the device-independent color space, and a unit to adjust the conversion unit based on the calculated target value of the device-dependent color space.

9 Claims, 13 Drawing Sheets

COLOR TO BE SPOT-ADJUSTED IS DETERMINED.
SELECT "SETTING" AND CHOOSE COLOR NAME YOU WISH TO ADJUST.
PRESS "NEXT" BUTTON AND PRESENT ADJUSTMENT PATCH WILL BE OUTPUT.

TARGET COLOR (D): SPORT COLOR

MEDIUM BEING CHECKED: BOND PAPER

LIST OF COLORS (L) :

| COLOR NAME | L VALUE | a VALUE | b VALUE | C VALUE | M VALUE | Y VALUE | K VALUE |
|---|---|---|---|---|---|---|---|
| Black | 28.08 | 0.56 | -0.31 | 213 | 210 | 247 | 77 |
| Red | 49.88 | 46.77 | 14.50 | 59 | 220 | 177 | 0 |
| Magenda | 51.73 | 55.25 | -10.76 | 55 | 221 | 31 | 0 |
| Blue | 51.54 | -31.38 | -43.83 | 234 | 33 | 20 | 0 |
| Cyan | 73.61 | -22.52 | -23.91 | 144 | 9 | 18 | 0 |
| White | 98.67 | 1.55 | -0.32 | 4 | 2 | 5 | 0 |

< RETURN (B) | NEXT (N) > | CANCEL

FIG.5

DEVICE VALUE PATCH DATA

|  | C OUTPUT VALUE | M OUTPUT VALUE | Y OUTPUT VALUE | K OUTPUT VALUE | |
|---|---|---|---|---|---|
| PATCH 0 | C0 | M0 | Y0 | K0 | 61 |
| PATCH 1 | C0 − α | M0 − α | Y0 − α | K0 | 62 |
| PATCH 2 | C0 + α | M0 − α | Y0 − α | K0 | 63 |
| PATCH 3 | C0 − α | M0 + α | Y0 − α | K0 | 64 |
| PATCH 4 | C0 − α | M0 − α | Y0 + α | K0 | 65 |
| PATCH 5 | C0 + α | M0 + α | Y0 − α | K0 | 66 |
| PATCH 6 | C0 − α | M0 + α | Y0 + α | K0 | 67 |
| PATCH 7 | C0 + α | M0 − α | Y0 + α | K0 | 68 |
| PATCH 8 | C0 + α | C0 + α | C0 + α | K0 | 69 |

OUTPUT VALUE IS HALFTONE DOT AREA FACTOR (0-100%);
α IS PERCENTAGE OF CHANGE

|  | L* VALUE | a* VALUE | b* VALUE |
|---|---|---|---|
| PATCH 0 | L0 | a0 | b0 |
| PATCH 1 | L1 | a1 | b1 |
| PATCH 2 | L2 | a2 | b2 |
| PATCH 3 | L3 | a3 | b3 |
| PATCH 4 | L4 | a4 | b4 |
| PATCH 5 | L5 | a5 | b5 |
| PATCH 6 | L6 | a6 | b6 |
| PATCH 7 | L7 | a7 | b7 |
| PATCH 8 | L8 | a8 | b8 |

|  | C OUTPUT VALUE | M OUTPUT VALUE | Y OUTPUT VALUE | K OUTPUT VALUE |
|---|---|---|---|---|
| PATCH 0 | C0 | M0 | Y0 | K0 |
| PATCH 1 | C0 − α | M0 − α | Y0 − α | K0 |
| PATCH 2 | C0 − α | M0 − α | Y0 | K0 |
| PATCH 3 | C0 | M0 − α | Y0 − α | K0 |
| PATCH 4 | C0 − α | M0 | Y0 − α | K0 |
| PATCH 5 | C0 + α | M0 + α | Y0 | K0 |
| PATCH 6 | C0 | M0 + α | Y0 + α | K0 |
| PATCH 7 | C0 + α | M0 | Y0 + α | K0 |
| PATCH 8 | C0 + α | C0 + α | C0 + α | K0 |

FIG.12

IMAGE PROCESSING APPARATUS, METHOD, PRODUCT FOR ADJUSTING OUTPUT PROFILE USED FOR COLOR MATCHING IN OUTPUT DEVICES

BACKGROUND OF THE INVENTION

1. Field of the Invention

The present invention relates to an image processing apparatus capable of adjusting an output profile used for color matching in output devices.

2. Description of the Related Art

In color prints, adding spot colors (feature colors) such as red, green and blue to the normal four colors—three primary colors of cyan, magenta and yellow and black—can realize more vivid and natural color reproduction. For example, a color matching technique is known which converts a target value of the spot color into a CMYK value using an output profile, the table showing correspondence between Lab values of the Lab color space and CMYK values of the CMYK color space.

The color a printer produces changes depending on the compositions of ink and toner. Even if the same colors are to be produced, different printers require different methods. So, the conversion from Lab values to CMYK values is not an easy task. Under this circumstance, a conventional practice involves printing a color chart by a printer, measuring the color of the color chart with a spectrophotometer and, based on the result of measurement, adjusting an output profile. However, if the output profile has been adjusted properly, any change in the state of printer caused by subsequent environmental changes or other factors may result in a printed output of the printer deviating from the target Lab value. To cope with this problem, one method has been proposed to adjust the output profile when the output profile accuracy is bad or when a target Lab value cannot be obtained from the adjusted output profile because of the printer state variations (e.g., Japanese Patent Laid-Open No. 2005-167630).

However, in the technology disclosed in Japanese Patent Laid-Open No. 2005-167630, Lab colors of a plurality of patches that are shifted in a device-independent space (Lab space) depend on the accuracy of the output profile. So, there is no assurance that appropriate patch positions for interpolation estimation can be obtained. Since shifts are made in the Lab space, measured values outside or near the boundary of a printer gamut (color reproducing range of the printer) may get replaced with approximate device values depending on the output profile and thus cannot be enclosed by the interpolation color patches. There is another problem that color detection cannot be done outside the printer gamut.

For example, a color profile value for a device-independent spatial value (L0, a0, b0) is C0, M0, Y0, K0 and a color profile value for (L1, a1, b1) is C1, M1, Y1, K1. This means that device values of C, M, Y, K (4-dimensional spatial values) all assume different values. The color profile value is an output value obtained by converting a device-independent spatial value using color profiling.

If L0, a0, b0 and L1, a1, b1 are inside the printer reproducible color range and close to each other in terms of color difference, the L1, a1, b1 can be reproduced by shifting only three CMY device values—the CMY being fundamental colors of the printer subtractive color mixing—to C2, M2, Y2, K0 (K remains the same).

However, the real output profiling has some degrees of color reproduction accuracy problem, such as tone value loss and tone value inversion. For example, even if L0, a0, b0 of a device-independent space is close to L1, a1, b1 in terms of color difference, an actually reproduced color of C1, M1, Y1, K1, that are shifted four CMYK device values, not the three CMY device values, may differ greatly from that of C0, M0, Y0, K0. Another example is inversion phenomena in which a color value that is expected to lower the brightness (make the color dark) may instead result in a brighter reproduced color and in which a color value that is expected to make the color more vivid may result in a dull color.

As described above, when the profiled, reproduced color accuracy is bad or particularly when there are reproduced color ranges in which tone representation is bad, the relation among device-dependent spatial value groups that have been converted using this profile can differ greatly from the relation among the pre-conversion device-independent spatial value groups.

Even if color patch data is shifted in a device-independent color space for profile corrections to compensate for changes between two states that are close to each other in color difference such as those before and after a printer status change, conversion of the device-independent color patch data into the device-dependent space may fail to shift the reproduced color as expected.

SUMMARY OF THE INVENTION

The present invention provides to obtain appropriate patch positions suited for interpolation estimation and adjust with high precision a conversion means that converts a target color of the device-independent color space into a value of the device-dependent color space.

The image processing apparatus of this invention comprises: a conversion means to convert a target value of a device-independent color space into a value of a device-dependent color space; a means to create a color chart to adjust the converted value of the device-dependent color space, the color chart including the value of the device-dependent color space corresponding to the target value of the device-independent color space and a plurality of values obtained by changing the value of the device-dependent color space in the device-dependent color space; a printing means to print the created color chart; a selection means to select in the device-independent color space a plurality of measured values measured from the printed color chart, having a predetermined relationship with the target value of the device-independent color space; a calculation means to convert the plurality of the selected measured values into a plurality of values of device-dependent color space and, from the plurality of the converted measured values, calculate a target value of the device-dependent color space corresponding to the target value of the device-independent color space; and an adjustment means to adjust the conversion means based on the calculated target value of the device-dependent color space.

The image processing method comprises: a conversion step to convert a target value of a device-independent color space into a value of a device-dependent color space; a step to create a color chart to adjust the converted value of the device-dependent color space, the color chart including the value of the device-dependent color space corresponding to the target value of the device-independent color space and a plurality of values obtained by changing the value of the device-dependent color space in the device-dependent color space; a printing step to print the created color chart; a selection step to select in the device-independent color space a plurality of measured values measured from the printed color chart, having a predetermined relationship with the target value of the device-independent color space; a calculation step to convert the plurality of the selected measured values into a plurality of values of device-dependent color space and, from the plurality of the converted measured values, calculate a target value of the device-dependent color space corresponding to the target value of the device-independent color space; and an adjustment step to adjust the conversion step based on the calculated target value of the device-dependent color space.

The computer-readable recording medium of this invention has recorded therein a program that instructs the computer to execute the above method.

The program instructs the computer to execute the above method.

With this invention, since the color patches are shifted in the device-dependent color space (e.g., CMYK color space), patch positions suited for interpolation estimation can be obtained. Further, since the color patches are shifted in the device-dependent color space, areas outside or near the boundary of printer gamut (printer color reproducing range) can be enclosed by interpolation color patches.

Further features of the present invention will become apparent from the following description of exemplary embodiments (with reference to the attached drawings).

DESCRIPTION OF THE EMBODIMENTS

Preferred embodiments of this invention will be described in detail by referring to the accompanying drawings. It is noted, however, that constitutional elements in these embodiments are described for exemplary purposes only and do not in any way limit the scope of this invention.

One embodiment of this invention will be explained by referring to the drawings.

Figure 1A:
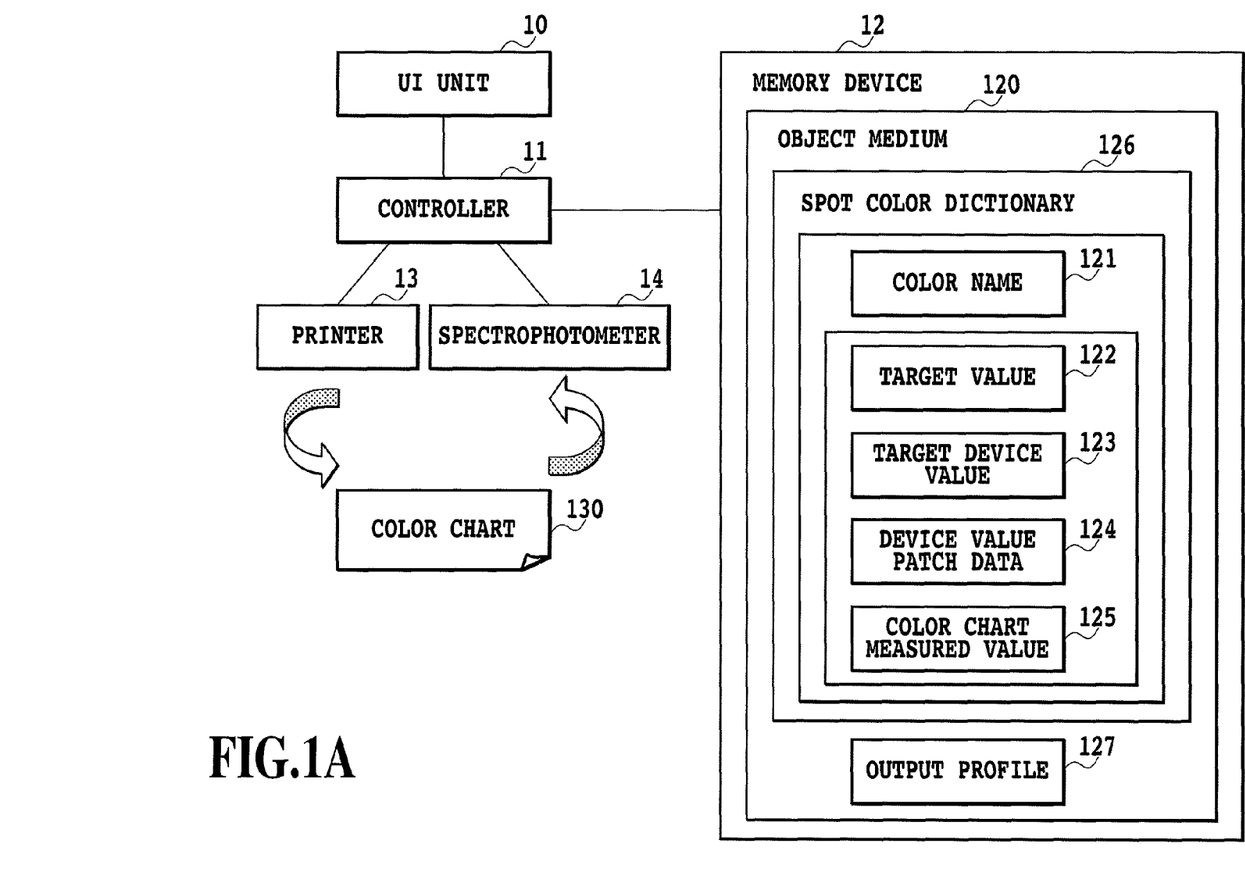
FIG. 1A is a block diagram showing an example configuration of an image processing apparatus.

FIG. 1A is a block diagram showing an example configuration of an image processing apparatus.

The image processing apparatus has a user interface (UI) 10, a controller 11, a memory device 12, a printer 13 as an output device and a spectrophotometer 14.

Figure 1B:
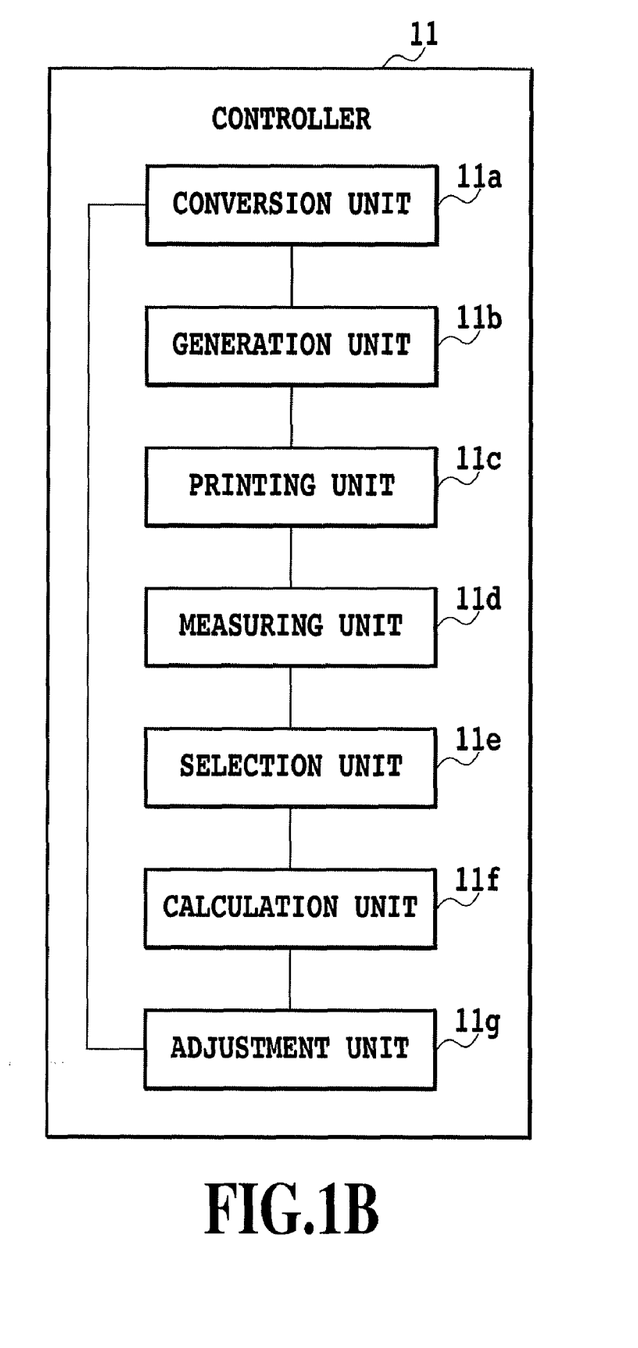
FIG. 1B is a block diagram showing an example configuration of a controller.

The user interface 10 has a display unit and an operation unit for displaying information to the user and accepting data entry from the user. The controller 11 executes instructions according to a program stored in the memory device 12 to control various units connected to the controller 11. FIG. 1B shows an example configuration of the units connected to the controller 11. Although in FIG. 1B these units are shown included in the controller 11, they may be arranged outside it.

In this embodiment, the memory device 12 stores, in addition to the program, a spot color dictionary 126 and an output profile 127 for each medium 120. The medium 120 refers to a kind of paper medium or similar ones (such as bond paper, coated paper and recycled paper) that the printer 13 prints on. Since different media have different characteristics such as white level and glossiness, the image processing apparatus needs to manage color related data for each medium.

The spot color dictionary 126 has color related data 121-125 registered therein. Denoted 121 is a color name of a named color space. Denoted 122 is a target value of a device-independent color space (e.g., Lab color space). Reference number 123 represents a target device value in a device-dependent color space (e.g., CMYK color space). Designated 124 is device value patch data of the device-dependent color space. Designated 125 is a color chart measured value of the device-independent color space. In the following explanations, the device independent color space is defined to be a Lab color space and the device-dependent color space a CMYK color space.

The color name 121 represents a name of named color (black, red, magenta, blue, cyan, white, etc.).

The target value 122 is a color value in Lab color space of a named color specified by the color name 121 and is obtained by the user measuring a color chart beforehand using a spectrophotometer.

The target device value 123 is a color value in the CMYK color space corresponding to the target value (in Lab color space) of a named color 121.

The device value patch data 124 is CMYK color space patch data corresponding to a target value (Lab color space) 122. The image processing apparatus uses the device value patch data (CMYK color space) 124 to create a color chart 130 and print it out.

The color chart measured value 125 is a color value in the Lab color space obtained by measuring the color chart 130 using the spectrophotometer 14.

The output profile 127 is created using a profile generation tool. The output profile 127 has described therein a correspondence table between the Lab color space values and the CMYK color space values, which is used when printing on the medium 120.

Figure 2:
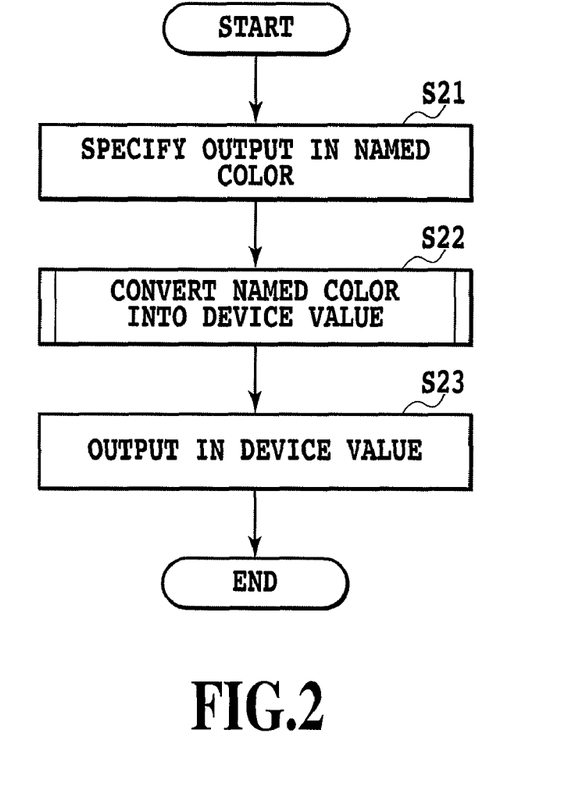
FIG. 2 is a flow chart showing a process of converting a named color into a target device value and outputting it.

FIG. 2 is a flow chart showing a process of converting a named color (Lab color space) into a target device value (CMYK color space) and outputting it.

At step S21, the user instructs the image processing apparatus to output a named color (Lab color space).

At step S22, the image processing apparatus converts the named color (Lab color space) into a target device value (CMYK color space). Details of this process will be explained by referring to FIG. 3.

Figure 3:
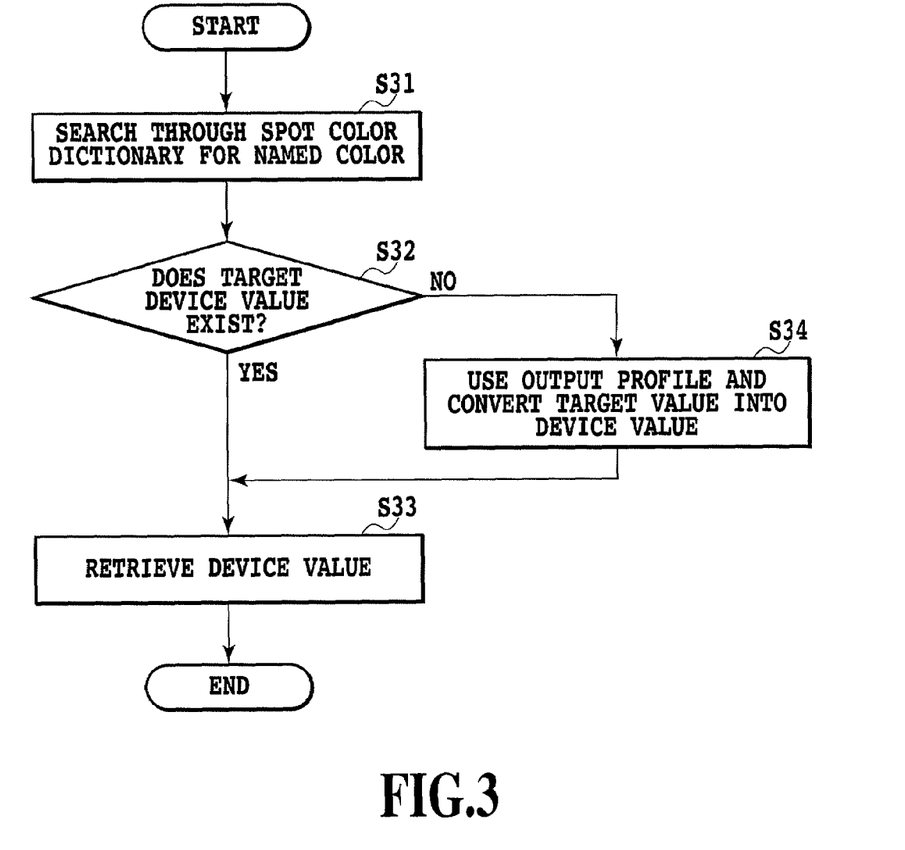
FIG. 3 is a flow chart showing details of the process of converting a named color into a target device value and outputting it.

When at step S21 the outputting of a named color (Lab color space) is instructed, the image processing apparatus at step S31 searches through the spot color dictionary 126 to read the specified named color (Lab color space).

At step S32 the image processing apparatus looks up a storage area in the memory device 12 of the target device value (CMYK color space) 123 linked with the named color (Lab color space) to see if the target device value (CMYK color space) corresponding to the specified named color (Lab color space) already exists in the storage area. If the check finds that the target device value (CMYK color space) exists, the image processing apparatus proceeds to step S33 and, if not, to step S34.

At step S33, the image processing apparatus retrieves the target device value (CMYK color space) present in the storage area. If on the other hand there is no target device value (CMYK color space) in the storage area, the image processing apparatus converts the target value 122 (Lab color space) into a target device value (CMYK color space) using the output profile 127.

Returning to FIG. 2, at step S23 the image processing apparatus produces a color of the target device value (CMYK color space) obtained at step S33.

Described above is the process of outputting the named color (Lab color space) at the target device value (CMYK color space).

Figure 4:
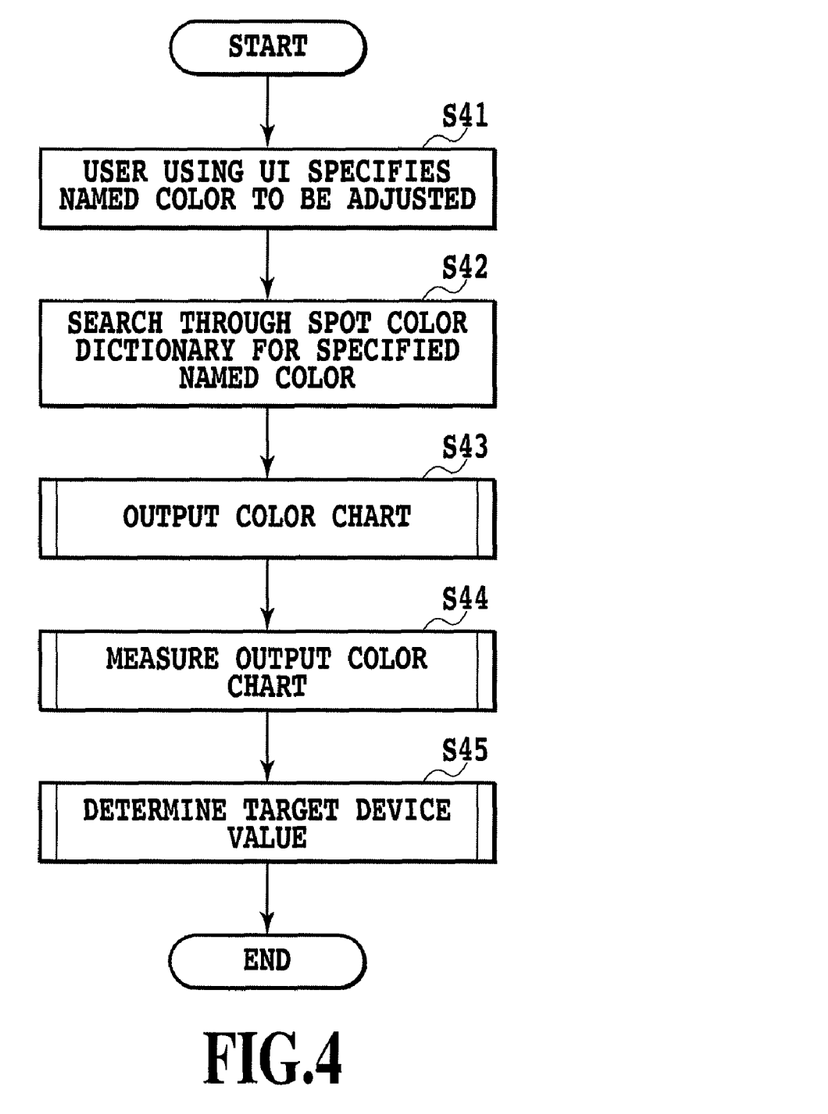
FIG. 4 is a flow chart showing a process of adjusting an output color of the named color.

FIG. 4 is a flow chart showing a process of adjusting an output color of a named color.

Figure 5:
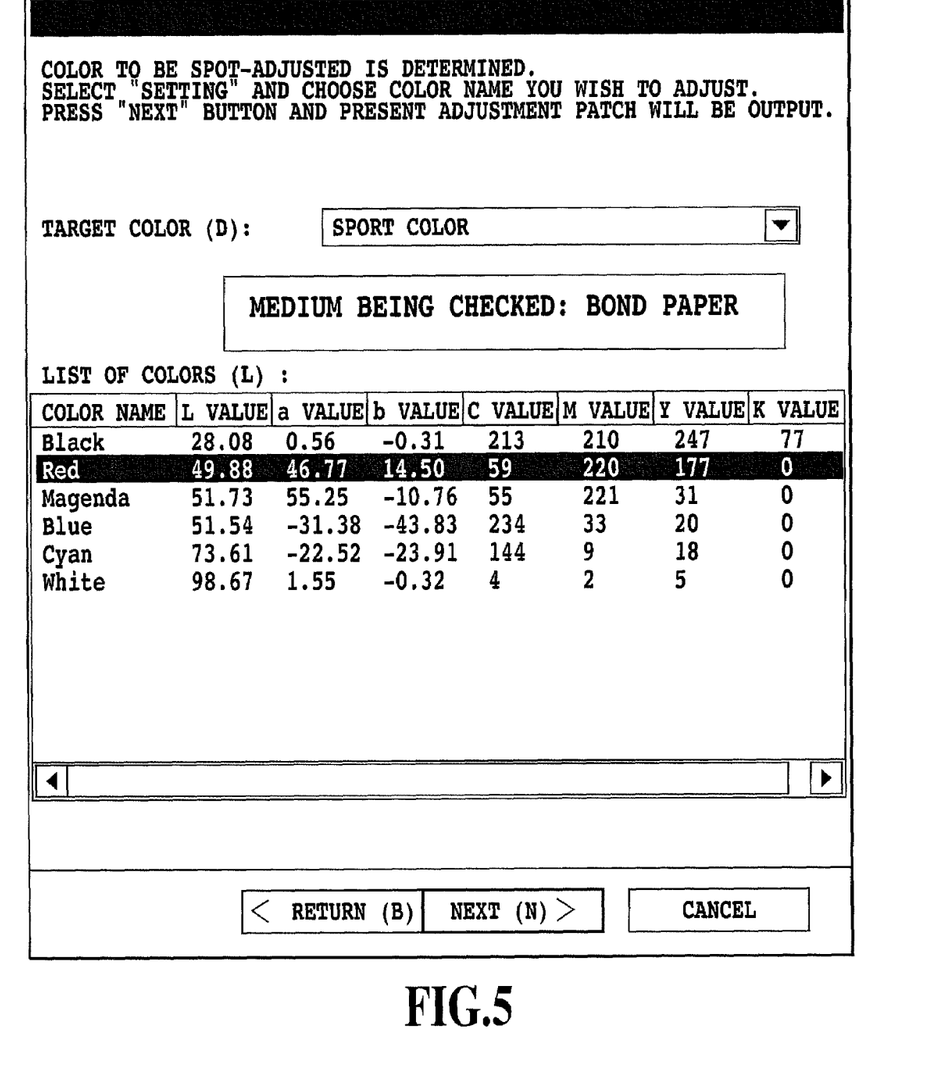
FIG. 5 is an example user interface screen displayed by an adjustment tool that lets the user adjust a target device value capable of reproducing an output color of the named color at a target value.

The image processing apparatus incorporates an adjustment tool to adjust the target device value (CMYK color space) 123 that can reproduce an output color of the named color at a target value (Lab color space). The adjustment tool reads a color name 121 associated with a particular medium 120 from the spot color dictionary, creates a list of color names to be adjusted and then displays the list on the user interface 10. FIG. 5 shows an example user interface screen that the adjustment tool displays.

At step S41 the user specifies a color name to be adjusted from the adjustment color name list displayed on the user interface screen. In the screen of FIG. 5, bond paper is specified as the medium to be adjusted and red as a color name for adjustment.

In step S42, the image processing apparatus reads a named color (Lab color space) of the user-specified color name from the spot color dictionary 126.

In step S43 the image processing apparatus creates an adjustment color chart using device value patch data (CMYK color space) and prints the color chart on the printer 13, as follows.

Figure 6:
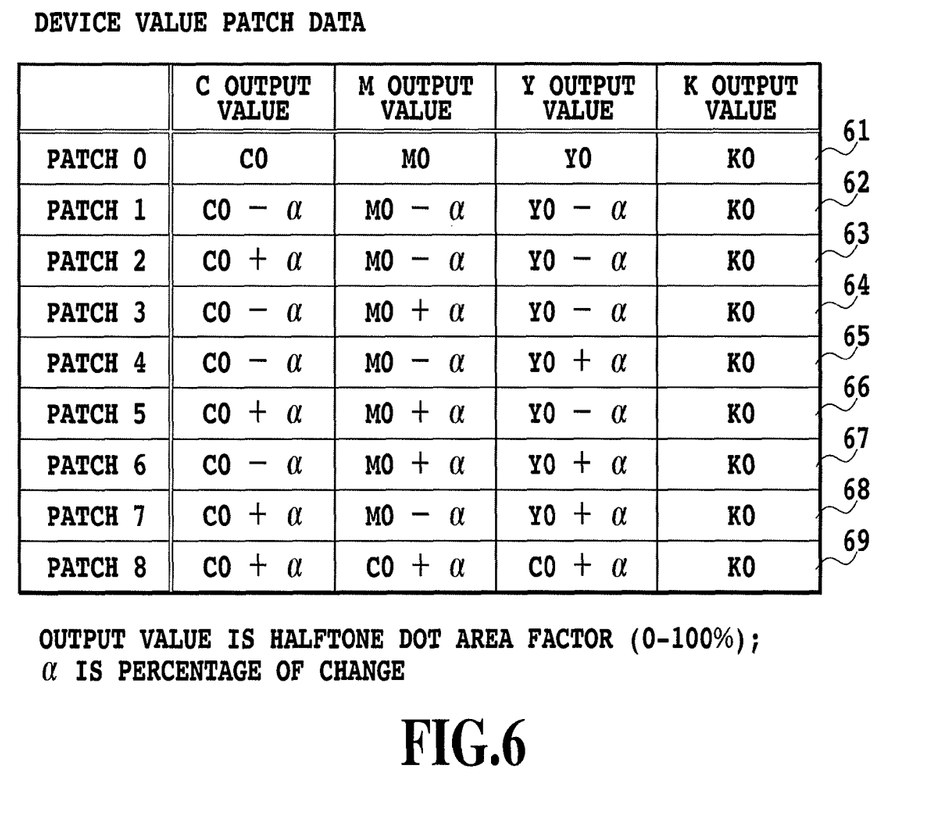
FIG. 6 shows an example of device value patch data.

FIG. 6 shows an example of device value patch data (CMYK color space).

Output values of patch 0 to patch 8 represent device value patch data (CMYK color space). Patch 0 represents an output value (C0, M0, Y0, K0) 61 of the CMYK space that can be obtained by performing a color conversion using the output profile 127 on a target value (Lab color space) 122 of the named color indicated by the user-specified color name 121. The output value represents an area factor of printed halftone dots in a range of 0-100%. The halftone dot area factor is a percentage of a half tone dot area in unit area and indicates a tone level. The halftone dot area factor is 0% for white and 100% for solid black. Patches 1-8 indicate CMYK output values 62-69 that change stepwise from a reference output value 61 of patch 0 by a predetermined shift ratio α (%). For example, in printing a corporate color with high accuracy, a color to be adjusted can reliably be specified by specifying a value of the named target color in the device-independent color space (e.g., Lab) for adjustment. On the other hand, as described in the Background of the Invention, by determining the patches 1-8 in the device-dependent color space (CMYK color space) such that they enclose the device value patch data of patch 0, which is the device-dependent color value corresponding to the value of the named target color, a color patch group can be created that realizes an intended shift in the device-dependent color space. To perform a readjustment necessitated by printer characteristic variations over time, a comparison is made between the target device value (CMYK color space) 123 stored in the memory device 12 and updated time and date in the output profile 127. If the comparison finds that the target device value (CMYK color space) 123 is new (as when it was updated a few minutes before), the target device value (CMYK color space) 123 may be used as an output value (C0, M0, Y0, K0) 61.

In step S43, the image processing apparatus registers the output values (61-69) of FIG. 6 as the device value patch data 124 with the spot color dictionary 126.

Figure 7:
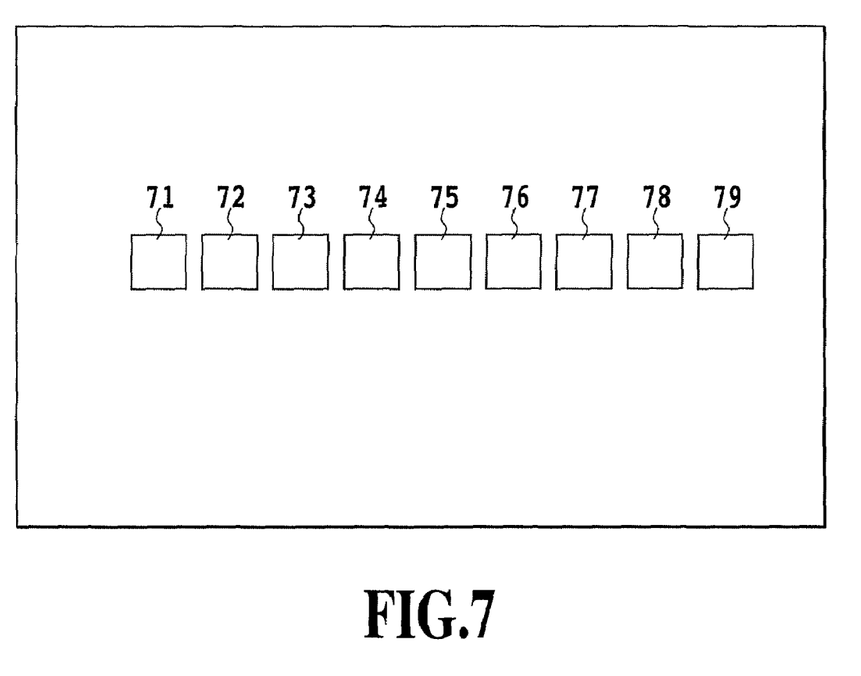
FIG. 7 shows an example of a color chart.

FIG. 7 shows an example of color chart printed in step S43. The output values (61-69) of FIG. 6 are printed as patch outputs 71-79.

Figure 8:
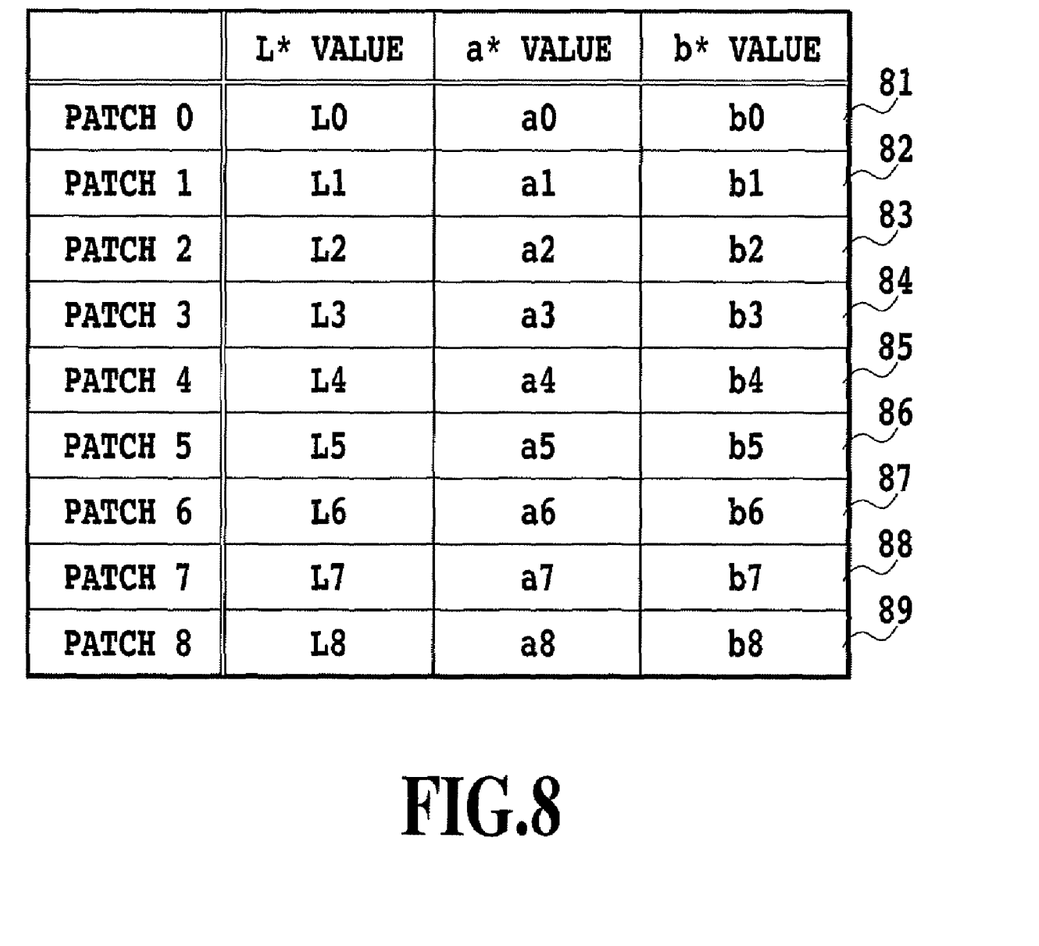
FIG. 8 shows an example of measured color values (81-89) obtained by measuring patch outputs 71-79 using a spectrophotometer 14.

In step S44 the user measures the color chart printed by step S43 using the spectrophotometer 14 and registers the measured value as a color chart measured value (Lab color space) 125 with the spot color dictionary 126. FIG. 8 shows one example of measured values (81-89) obtained by measuring the patch outputs 71-79 using the spectrophotometer 14.

In step 45, the image processing apparatus calculates a target device value (CMYK color space) 123 capable of reproducing the target value (Lab color space) 122 of the named color 121, according to the color chart measured values (Lab color space). Then, based on the target device value (CMYK color space) thus obtained, the output profile 127 is adjusted.

Figure 9:
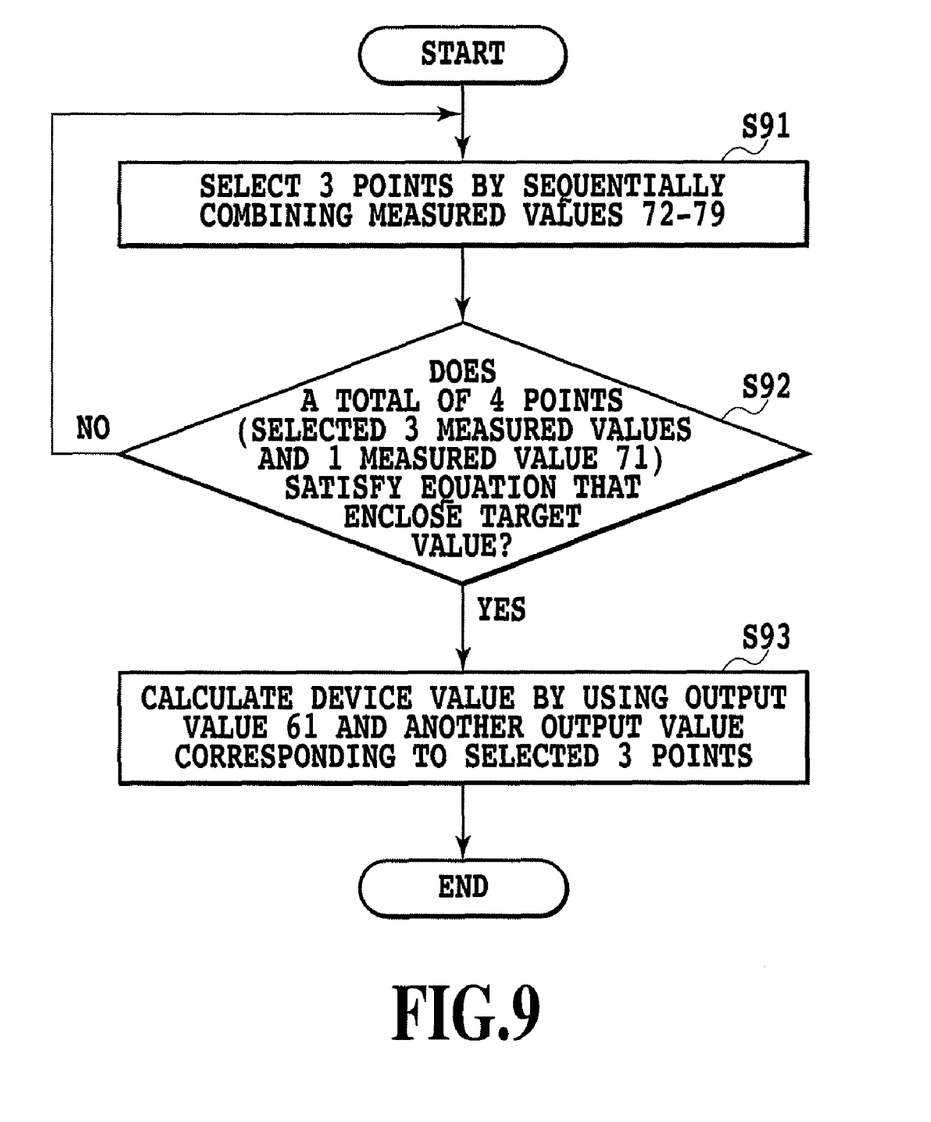
FIG. 9 is a flow chart showing details of a process of determining a target device value that can reproduce a target value of the named color.

FIG. 9 is a flow chart showing details of step S45.

Figure 10A:
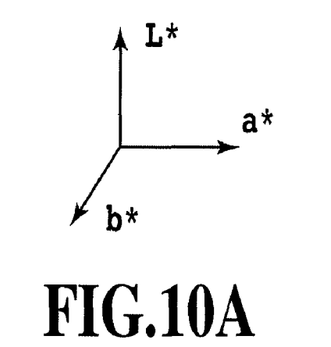
FIG. 10A and FIG. 10B are schematic diagrams showing that a target value PT is spatially enclosed by four measured color value (P0, P1, P2, P3)
Figure 10B:
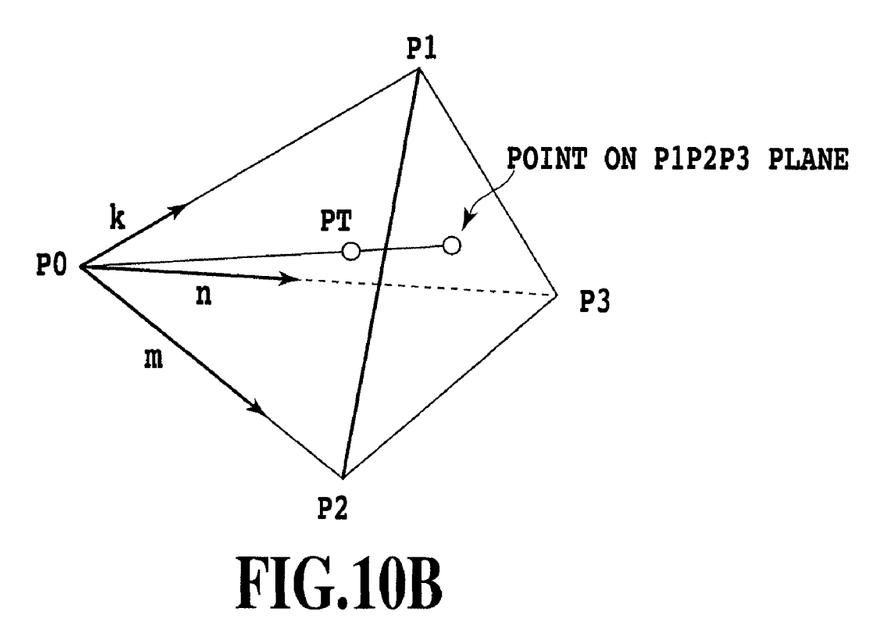

In step 91 the image processing apparatus determines a plurality of color chart measured values (Lab color space) that have a predetermined relationship with the target value in the Lab color space. That is, the image processing apparatus determines four color chart measured values (Lab color space) that spatially enclose the target value (Lab color space) 122 with tetrahedrons in the Lab color space. Of the four points, one point is a color chart measured value (Lab color space) 71 and the remaining three points are selected from the color chart measured values (Lab color space) 72-79 according to a method described later. FIG. 10 schematically shows a target value PT spatially enclosed by four color chart measured values (P0, P1, P2, P3) in the Lab color space. P0 represents a Lab vector value of the color chart measured value (Lab color space) 71. P1, P2, P3 represent Lab vector values of any three of the color chart measured values (Lab color space) 72-79. PT represents a Lab vector value of the target value (Lab color space) 122.

In step S92, the image processing apparatus selects three points (P1, P2, P3) from the color chart measured values 72-79 that satisfy Equation 1 and sets them as the three points enclosing PT.

$$PT = P0 + k(P1-P0) + m(P2-P0) + n(P3-P0) \quad \text{Equation 1}$$

where k>0, m>0, n>0 (k, m, n are constants), k+m+n<1. Then four points P0-P3 and constants k, m, n are determined.

In step S93, the image processing apparatus calculates a target device value (CMYK color space) 123 that can reproduce the target value (Lab color space) 122 of the named color 121. The calculation uses an output value 61 of the CMYK color space corresponding to P0 (Lab color space) and output values of CMYK color space (three points of 62-69) corresponding to P1-P3 (Lab color space). That is, from the principle of tetrahedron interpolation, $$DPT=DP0+k(DP1-DP0)+m(DP2-DP0)+n(DP3-DP0) \quad \text{Equation 2}$$

holds (where k, m, n are constants satisfying Equation 1).

Here DP0 is an output value (CMYK color space) 61 corresponding to P0 (Lab color space). DP1-DP3 are output values (CMYK color space) corresponding to P1-P3 (Lab color space). DPT is a target device value (CMYK color space) 123 corresponding to PT (Lab color space).

So, by using Equation 2, a target device value DPT (CMYK color space) capable of reproducing the target value PT (Lab color space) can be calculated.

Figure 11A:
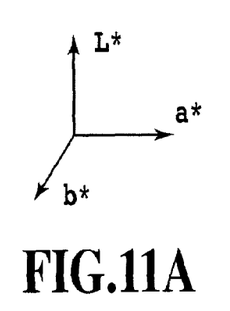
FIG. 11A and FIG. 11B are schematic diagrams showing that a target value PT lies on a straight line extending from point P0 and passing through a triangle plane) spatially defined by points P1-P3.
Figure 11B:
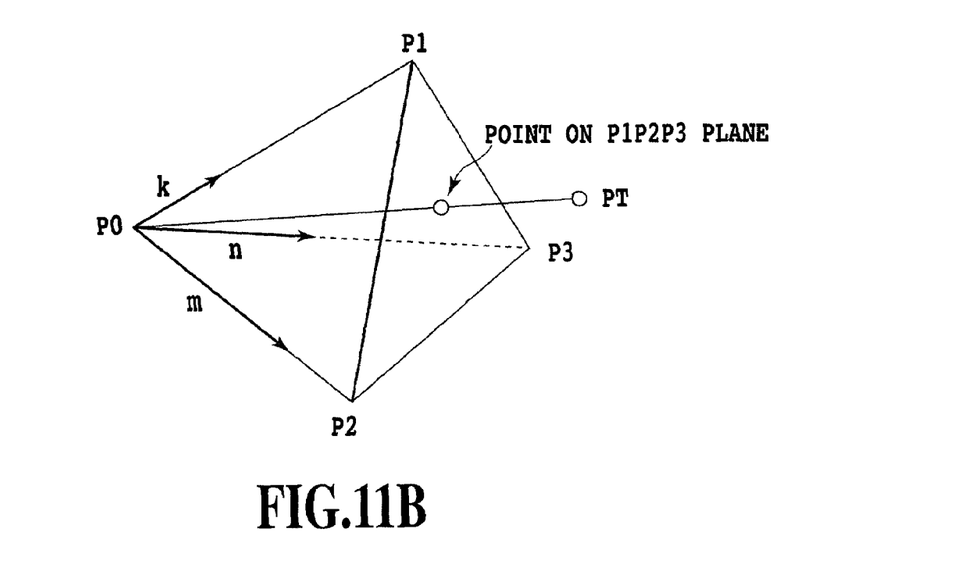

In the above embodiment, there can be a situation where the target value PT (Lab color space) may fail to be spatially enclosed by P0-P3 (Lab color space). That is, as shown in FIG. 11, the target value PT (Lab color space) 122 may lie on an extended line originating from P0 and passing through a triangle (P1P2P3 plane) defined by P1-P3. In that case, PT, P1-P3 satisfy Equation 3.

$$PT=P0+k(P1-P0)+m(P2-P0)+n(P3-P0) \quad \text{Equation 3}$$

where k>0, m>0, n>0 (k, m, n are constants), k+m+n>=1 (equation holds when the target value is on the P1P2P3 plane).

Therefore, as in the above embodiment, selecting three points (P1-P3) from among the measured values (72-79) that satisfy Equation 3 and using Equation 2 can calculate the target device value DPT (CMYK color space) 123 that can reproduce the target value PT (Lab color space).

Figure 12:
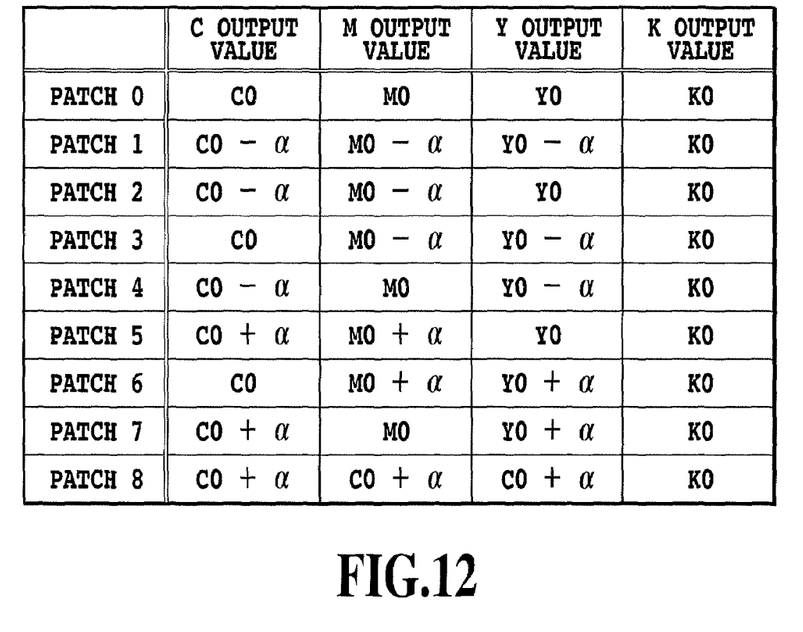
FIG. 12 shows an example of device value patch data.

Although in the above embodiment the device value is taken to be a CMYK value, it may be an RGB value. In that case, by shifting the RGB value, it is possible to obtain an RGB value that can reproduce the target value (Lab color space). The device value may also be a CMYK value having other characteristic or spot color than CMYK value. In that case, by shifting only CMY a device value (CMYK+spot value) that can reproduce the target value (Lab color space) can be obtained. In the example of FIG. 6, although the CMY shifting rule is a simultaneous shift of thee values, other shift, such as two-value shift, may be done (see FIG. 12). The CMY shifting rule may also be a one-value shift. Further, while the example of FIG. 6 has shown the CMY shift values to be constant, the amount of shift may be changed for each patch according to the hue of the target value to be adjusted.

Other Embodiment

The present invention can take a form of a system, device, method, computer program or computer-readable storage medium. This invention is also applicable to a system composed of a plurality of devices or to one device.

Embodiments of this invention include one in which a system or device is loaded, through a storage medium or a network, with a computer program realizing the above functions of this invention to have a computer in the system or device execute the program. The storage medium is a computer-readable medium. So, this embodiment includes the computer program itself that implements the functions of this invention. The computer program includes object codes, programs to be executed by an interpreter, and script data to be supplied to OS. The storage medium may be a floppy disk (registered trade mark), hard disk, optical disc, magnetooptical disc, MO, CD-ROM, CD-R, CD-RW, magnetic tape, non-volatile memory card, ROM and DVD.

The functions of the above embodiment can be implemented even after the computer program is read out from the storage medium and written into a memory in a function expansion board inserted into the computer or a function expansion unit connected to the computer. That is, the functions of the above embodiment can also be implemented by having a CPU in the function expansion board or function expansion unit execute a part or all of the actual processing according to instructions from the computer program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-053907, filed Mar. 4, 2008, which is incorporated herein by reference in its entirety.

What is claimed is:

1. An image processing apparatus comprising:
    a conversion means to convert a target value of a device-independent color space into a value of a device-dependent color space;
    a means to create a color chart to adjust the converted value of the device-dependent color space, the color chart including the value of the device-dependent color space corresponding to the target value of the device-independent color space and a plurality of values obtained by changing the value of the device-dependent color space in the device-dependent color space;
    a printing means to print the created color chart;
    a selection means to select in the device-independent color space a plurality of measured values, measured from the printed color chart, having a predetermined relationship with the target value of the device-independent color space;
    a calculation means to convert the plurality of the selected measured values into a plurality of values of device-dependent color space and, from the plurality of the converted measured values, calculate a target value of the device-dependent color space corresponding to the target value of the device-independent color space; and
    an adjustment means to adjust the conversion means based on the calculated target value of the device-dependent color space.

2. An image processing apparatus according to claim 1, wherein the selection means selects a predetermined number of the measured values to enclose the device-independent color space target value in the device-independent color space.

3. An image processing apparatus according to claim 2, wherein the predetermined number of the measured values comprise the device-dependent color space value corresponding to the target value and any of the plurality of the changed values of the device-dependent color space.

4. An image processing apparatus according to claim 1, wherein the device-dependent color space is a CMYK color space;
    wherein the color chart creation means creates a color chart including a CMYK value corresponding to the device-independent color space target value and a plurality of CMYK values that are obtained by changing each of C, M, Y values of the CMYK value at a predetermined percentage.

5. An image processing method comprising:
    a conversion step to convert a target value of a device-independent color space into a value of a device-dependent color space;

a step to create a color chart to adjust the converted value of the device-dependent color space, the color chart including the value of the device-dependent color space corresponding to the target value of the device-independent color space and a plurality of values obtained by changing the value of the device-dependent color space in the device-dependent color space;

a printing step to print the created color chart;

a selection step to select in the device-independent color space a plurality of measured values measured from the printed color chart, having a predetermined relationship with the target value of the device-independent color space;

a calculation step to convert the plurality of the selected measured values into a plurality of values of device-dependent color space and, from the plurality of the converted measured values, calculate a target value of the device-dependent color space corresponding to the target value of the device-independent color space; and an adjustment step to adjust the conversion step based on the calculated target value of the device-dependent color space.

6. An image processing method according to claim 5, wherein the selection step selects a predetermined number of the measured values to enclose the device-independent color space target value in the device-independent color space.

7. An image processing method according to claim 6, wherein the predetermined number of the measured values comprise the device-dependent color space value corresponding to the target value and any of the plurality of the changed values of the device-dependent color space.

8. An image processing method according to claim 5, wherein the color chart creation step creates a color chart including a CMYK value corresponding to the device-independent color space target value and a plurality of CMYK values that are obtained by changing each of C, M, Y values of the CMYK value at a predetermined percentage.

9. A computer-readable recording medium non-transitory having computer-executable instructions for performing an image processing method, the method comprising:

a conversion step to convert a target value of a device-independent color space into a value of a device-dependent color space;

a step to create a color chart to adjust the converted value of the device-dependent color space, the color chart including the value of the device-dependent color space corresponding to the target value of the device-independent color space and a plurality of values obtained by changing the value of the device-dependent color space in the device-dependent color space;

a printing step to print the created color chart;

a selection step to select in the device-independent color space a plurality of measured values measured from the printed color chart, having a predetermined relationship with the target value of the device-independent color space;

a calculation step to convert the plurality of the selected measured values into a plurality of values of device-dependent color space and, from the plurality of the converted measured values, calculate a target value of the device-dependent color space corresponding to the target value of the device-independent color space; and an adjustment step to adjust the conversion step based on the calculated target value of the device-dependent color space.

* * * * *